US008006546B2

(12) United States Patent
Agneray et al.

(10) Patent No.: US 8,006,546 B2

(45) Date of Patent: Aug. 30, 2011

(54) METHOD AND DEVICE TO OPTIMIZE THE EXCITATION FREQUENCY OF A RESONATOR BASED ON PREDETERMINED RELATIONSHIPS FOR OPERATING PARAMETERS OF A COMBUSTION ENGINE

(75) Inventors: Andre Agneray, Boulogne Billancourt (FR); Julien Couillaud, Athis-Mons (FR); Clement Nouvel, Clamart (FR)

(73) Assignee: Renault S.A.S, Boulogne-Billancourt (FR)

( * ) Notice: Subject to any disclaimer, the term of this patent is extended or adjusted under 35 U.S.C. 154(b) by 363 days.

(21) Appl. No.: 12/097,012

(22) PCT Filed: Dec. 6, 2006

(86) PCT No.: PCT/FR2006/051298

§ 371 (c)(1), (2), (4) Date: Oct. 23, 2008

(87) PCT Pub. No.: WO2007/071867

PCT Pub. Date: Jun. 28, 2007

(65) Prior Publication Data

US 2009/0165764 A1 Jul. 2, 2009

(30) Foreign Application Priority Data

Dec. 15, 2005 (FR) ...................................... 05 12770

(51) Int. Cl.
*G01M 15/04* (2006.01)

(52) U.S. Cl. .................................................... 73/114.62

(58) Field of Classification Search ............... 73/114.58, 73/114.61, 114.62
See application file for complete search history.

(56) References Cited

U.S. PATENT DOCUMENTS

| | | | | |
|---|---|---|---|---|
| 5,568,801 | A | 10/1996 | Paterson et al. | |
| 5,636,620 | A * | 6/1997 | Kiess et al. | 123/625 |
| 6,138,653 | A | 10/2000 | Juffinger et al. | |
| 2004/0237950 | A1 | 12/2004 | Metzelard | |

FOREIGN PATENT DOCUMENTS

| | | |
|---|---|---|
| EP | 1 515 594 | 3/2005 |
| FR | 2 649 759 | 1/1991 |

OTHER PUBLICATIONS

U.S. Appl. No. 12/096,382, filed Jun. 6, 2008, Agneray, et al.
U.S. Appl. No. 12/593,482, filed Sep. 28, 2009, Agneray, et al.

* cited by examiner

*Primary Examiner* — Eric S McCall

(74) *Attorney, Agent, or Firm* — Oblon, Spivak, McClelland, Maier & Neustadt, L.L.P.

(57) ABSTRACT

A device for controlling a power supply of a radio frequency ignition of a combustion engine, including: an interface that receives measurement signals of operating parameters of a combustion engine; an interface that outputs a control signal; a module that stores relationships between measurement signals and the frequency of a control signal to be generated; a module that determines the frequency of a control signal to be generated on the basis of measurement signals received on the reception interface and of the relationships stored; and a module that applies the control signal at the determined frequency.

11 Claims, 1 Drawing Sheet

METHOD AND DEVICE TO OPTIMIZE THE EXCITATION FREQUENCY OF A RESONATOR BASED ON PREDETERMINED RELATIONSHIPS FOR OPERATING PARAMETERS OF A COMBUSTION ENGINE

BACKGROUND

The invention relates to supply of power to a resonator by voltages greater than 200 V and frequencies higher than 1 MHz and in particular to the supply of power to resonators used in controlled ignitions.

For application to automobile plasma ignition, resonators whose resonant frequency is higher than 1 MHz are arranged at the spark plug and are typically supplied with voltages greater than 200 V and are subjected to a current greater than 10 A. This application necessitates the use of radiofrequency resonators with a high quality factor and a high voltage generator, the operating frequency of which is very close to the resonant frequency of the resonator. The more the difference between the resonant frequency of the resonator and the operating frequency of the generator is reduced, the higher the amplification factor (ratio of its output voltage to its input voltage) of the resonator. The higher the quality factor of the resonator, the more the operating frequency of the generator must be close to its resonant frequency.

Numerous parameters have an impact on the resonant frequency: manufacturing tolerances, temperature in the combustion chamber or in the cooling circuit, or aging drift in the resonator components. These parameters have an even more significant impact for the particular case of spark plug coils due to the proximity between certain components of the resonator and the combustion chamber. Guaranteeing an amplification factor of the resonator is hence a delicate matter.

BRIEF SUMMARY

The invention aims to resolve this drawback. The invention thus proposes a power-supply control device for a radiofrequency ignition of a combustion engine, comprising:

- an interface for receiving measurement signals of operating parameters from a combustion engine;
- an output interface for a control signal;
- a memory module storing relationships between the measurement signals and the frequency of a control signal to be generated;
- a module determining the frequency of a control signal to be generated as a function of measurement signals received at the reception interface and of the relationships stored in the memory module; and
- a module applying the control signal at the determined frequency at the output interface.

The invention also pertains to a radiofrequency ignition power supply comprising:

- a control device as described above; and
- a power supply circuit having a switch controlled by the control signal of the control device, the switch applying an intermediate voltage at an output of the power supply circuit at a frequency determined by the control signal.

The invention furthermore pertains to an ignition system comprising:

- a power supply as described above; and
- a resonator having a resonant frequency higher than 1 MHz, connected to the output of the power-supply circuit and comprising two electrodes, the resonator being able to generate a plasma between the two electrodes when a high voltage level is applied at the output of the power-supply circuit.

BRIEF DESCRIPTION OF THE DRAWINGS

Other features and advantages of the invention will emerge clearly from the description thereof below, provided by way of indication and in no way limiting, with reference to the appended drawings in which.

DETAILED DESCRIPTION

The invention proposes a power-supply control device for a radiofrequency ignition of a combustion engine. The control device takes account of measurement signals of operating parameters of the combustion engine and determines the frequency of the ignition control signal to be generated as a function of the stored relationships between the measurement signals and the frequency of the control signal.

By adapting the frequency of the control signal as a function of the operating parameters of the engine, this frequency will be kept very precisely at a value close to the resonant frequency of the resonator. In this way an open-loop servo-control of frequency is produced.

Figure 1:
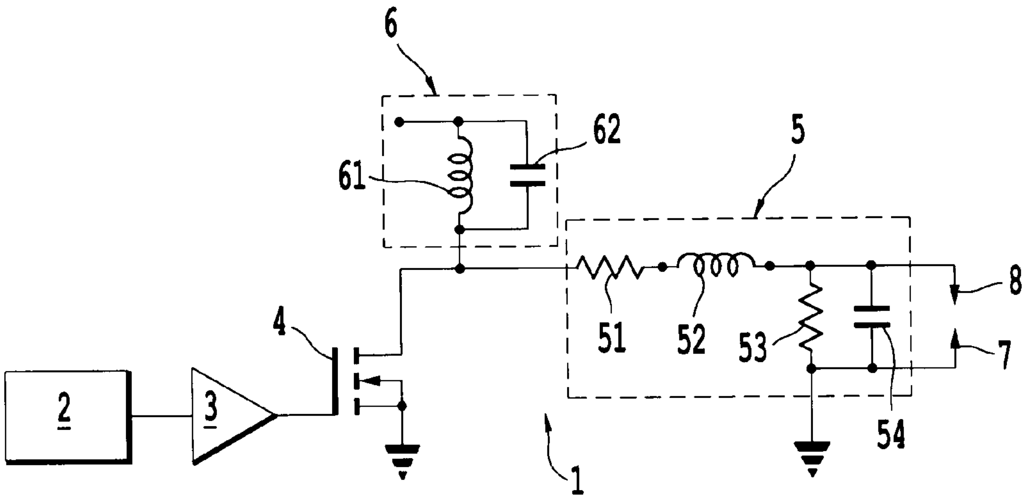
FIG. 1 illustrates an ignition system integrating a control device according to the invention.

FIG. 1 illustrates an ignition system 1, comprising a control device 2 according to the invention. With the exception of the control device 2, examples of the elements of the ignition system 1 illustrated have been detailed in the document EP-A-1 515 594. The control device 2 is connected to an amplifier 3. The amplifier is connected to the gate of a MOSFET power transistor 4. The transistor 4 serves as a switch controlled by the control signal from the device 2. The switch 4 is intended to allow application of a high voltage level between the terminals of the electrodes at a frequency defined by the control signal. A series resonator 5 is connected between the drain of the transistor 4 and ground. The resonator 5 comprises a resistor 51 in series with an inductor 52, and a resistor 53 in parallel with a capacitor 54. The resistors 51 and 53 are equivalent resistors following in particular from the imperfection of the capacitors 52 and 54. The ignition electrodes 7 and 8 are connected to the terminals of the capacitor 54. A resonant circuit 6 is connected between an intermediate voltage source and the drain of the transistor 4. This circuit 6 comprises an inductor 61 and a capacitor 62.

Figure 2:
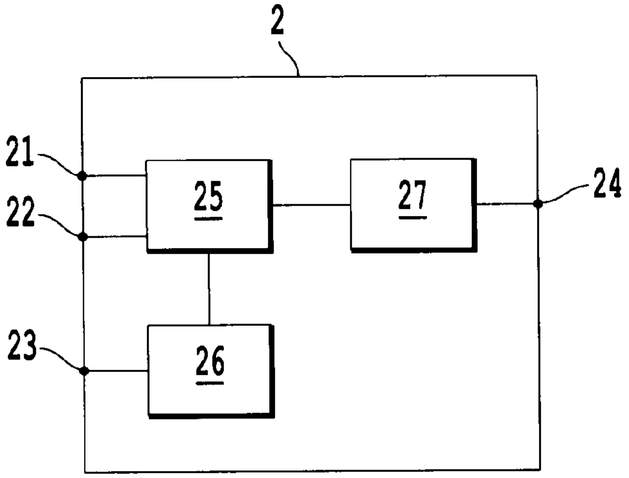
FIG. 2 schematically illustrates a control device according to the invention.

FIG. 2 schematically illustrates an example of a control device 2 according to the invention. The control device 2 comprises an interface 21 for receiving measurement signals of operating parameters from the combustion engine. Among the engine operating parameters measured, it is possible to envision the temperature of the engine oil, the temperature of the engine coolant, the engine torque, the engine speed, the ignition angle, the temperature of the inlet air, the manifold pressure, atmospheric pressure or the pressure in the combustion chamber. These types of measurement may be carried out in ways known per se to a person skilled in the art.

Advantageously, the device 2 furthermore comprises an interface 22 for receiving measurement signals of operating parameters from the power supply, receiving for example a measurement of the voltage at the terminals of the electrodes or a measurement of the intermediate voltage applied to the circuit 6.

The device 2 comprises a memory module 26 in which the relationships between the measurement signals and the frequency of a control signal to be generated are stored. These relationships may be established as a function of preliminary tests. The memory module 26 may store the relationships in the form of a function associating predetermined measurement signals with a unique control signal frequency. It is possible, for example, to extrapolate a linear function or a polynomial function as a function of the results of preliminary tests on a resonator while varying the different parameters taken into account. The memory module may also memorize the relationships in the form of a multidimensional table having measurement signals as its input.

According to a simplified version, the module 26 stores the relationships providing a control frequency as a function of a temperature measurement in the proximity of the resonator 5 and of measurements of electrical operating parameters of the power supply. These relationships may be established as a function of preliminary tests that establish the impact of the temperature on the resonant frequency of the resonator 5.

The device 2 comprises a module 25 determining the frequency of the control signal to be generated as a function of the measurement signals received and of the relationships stored in the memory 26. The frequency of the control signal is provided by the module 25 to a module 27, applying the control signal at said frequency to an output interface 24. The module 27 is, for example, a clock generator chosen in a suitable way by a person skilled in the art.

It is possible to provide a programming interface 23 allowing instructions for changing the relationships or the parameters of the resonator stored in the memory module 26 to be received and carried out. The programming interface 23 may in particular be a wireless communications interface. In this way, it is possible to envision updating the relationships stored in the module 26. In this way, if better knowledge is acquired of the behavior of the resonator, the operation of the ignition system may be optimized after delivery. Moreover, the programming interface 23 allows the module 26 to be programmed on the basis of the values of electrical parameters (for example, the resonant frequency) of a resonator 5 measured in the factory. A barcode may be linked with the resonator 5 so as to encode the values of the electrical parameters determined, this barcode being read so as to enter these values into the module 26 when connecting the resonator to the device 2. In this way, the manufacturing tolerances of the resonators 5 will have no impact on the precision of the control frequency generated.

For application to ignition of a combustion engine, the ignition system typically comprises a series resonator 5, the frequency of which is higher than 1 MHz, means for applying a voltage greater than 200 V between the terminals of the electrodes and a control device able to generate a control signal having a frequency of the order of magnitude of the resonant frequency of the resonator.

The invention claimed is:

1. A power-supply control device for a radiofrequency ignition of a combustion engine, comprising:
- a memory module that stores relationships between predetermined values of measurement signals of operating parameters from the combustion engine and frequencies of a control signal;
- a reception interface that receives current values of the measurement signals;
- a determination module that determines a desired frequency of the control signal as a function of the current values of the measurement signals received at the reception interface and of the relationships stored in the memory module;
- a generation module that generates the desired frequency of the control signal determined by the determination module; and
- an output interface to output the desired frequency of the control signal from the generation module to control the ignition.

2. The control device as claimed in claim 1, wherein the measurement signals are chosen among a group including temperature of engine oil, temperature of engine coolant, engine torque, engine speed, ignition angle, temperature of inlet air, manifold pressure, atmospheric pressure, or pressure in a combustion chamber of the engine.

3. The device as claimed in claim 1, wherein the memory module stores the relationships in a form of a multidimensional table having the measurement signals as an input of the multidimensional table.

4. The device as claimed in claim 1, wherein the memory module stores the relationships in a form of a function associating a unique frequency of the control signal with the predetermined values of the measurement signals.

5. The control device as claimed in claim 1, wherein the reception interface further receives measurement signals of operating parameters of a power supply of the ignition.

6. The control device as claimed in claim 5, wherein the measurement signals of the operating parameters of the power supply include a voltage at terminals of electrodes of a resonator connected to the output interface and an intermediate voltage applied to a power supply circuit of the power supply.

7. The device as claimed in claim 1, further comprising a programming interface connected to the memory module, the interface configured to receive values of electrical parameters of a resonator connected to the output interface, the values of the electrical parameters stored in the memory module entering into the stored relationships.

8. The control device as claimed in claim 7, wherein the stored values of electrical parameters come from measurements carried out on the resonator connected to the output interface.

9. A radiofrequency ignition power supply, comprising:
- a control device as claimed in claim 1; and
- a power supply circuit including a switch controlled by the control signal of the control device, the switch applying an intermediate voltage at an output of the power supply circuit at the desired frequency of the control signal.

10. An ignition system, comprising:
- a power supply as claimed in claim 9; and
- a resonator having a resonant frequency higher than 1 MHz, connected to the output of the power supply circuit and comprising two electrodes, the resonator configured to generate a plasma between the two electrodes when a high voltage level is applied at the output of the power supply circuit.

11. A method of controlling a power supply for a radiofrequency ignition of a combustion engine, comprising:
- storing relationships between predetermined values of measurement signals of operating parameters from the combustion engine and frequencies of a control signal;
- receiving current values of the measurement signals;
- determining a desired frequency of the control signal as a function of the received current values of the measurement signals and of the stored relationships;
- generating the determined desired frequency of the control signal; and
- outputting the generated desired frequency of the control signal to control the ignition.

* * * * *